US006567771B2

(12) United States Patent
Erdogan et al.

(10) Patent No.: US 6,567,771 B2
(45) Date of Patent: May 20, 2003

(54) WEIGHTED PAIR-WISE SCATTER TO IMPROVE LINEAR DISCRIMINANT ANALYSIS

(75) Inventors: Hakan Erdogan, Croton on Hudson, NY (US); Yuqing Gao, Mount Kisco, NY (US); Yongxin Li, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 176 days.

(21) Appl. No.: 09/785,606

(22) Filed: Feb. 16, 2001

(65) Prior Publication Data

US 2002/0049568 A1 Apr. 25, 2002

Related U.S. Application Data

(60) Provisional application No. 60/228,638, filed on Aug. 29, 2000.

(51) Int. Cl.[7] .............................................. G06F 15/00

(52) U.S. Cl. ....................................... 702/189; 702/190

(58) Field of Search ............................. 702/66, 69, 79, 702/173–176, 182, 189, 190; 700/213, 214, 225, 226; 706/20, 21, 22

(56) References Cited

U.S. PATENT DOCUMENTS 4,914,703 A * 4/1990 Gillick ...................... 704/245
5,945,675 A * 8/1999 Malins ................. 250/339.12
6,263,359 B1 * 7/2001 Fong et al. ................ 709/103
6,405,065 B1 * 6/2002 Malin et al. ............... 600/310

* cited by examiner

*Primary Examiner*—Bryan Bui
(74) *Attorney, Agent, or Firm*—Ryan, Mason & Lewis, LLP; Thu Ann Dang

(57) ABSTRACT

In general, the present invention determines and applies weights for class pairs. The weights are selected to better separate, in reduced-dimensional class space, the classes that are confusable in normal-dimensional class space. During the dimension-reducing process, higher weights are preferably assigned to more confusable class pairs while lower weights are assigned to less confusable class pairs. As compared to unweighted Linear Discriminant Analysis (LDA), the present invention will result in decreased confusability of class pairs in reduced-dimensional class space. The weights can be assigned through a monotonically decreasing function of distance, which assigns lower weights to class pairs that are separated by larger distances. Additionally, weights may also be assigned through a monotonically increasing function of confusability, in which higher weights would be assigned to class pairs that are more confusable.

36 Claims, 5 Drawing Sheets

WEIGHTED PAIR-WISE SCATTER TO IMPROVE LINEAR DISCRIMINANT ANALYSIS

CROSS REFERENCE TO RELATED APPLICATIONS

This application claims the benefit of U.S. Provisional application Serial No. 60/228,638, filed Aug. 29, 2000.

FIELD OF THE INVENTION

The present invention relates to linear discriminant analysis and, more particularly, relates to weighted pair-wise scatter to improve linear discriminant analysis.

BACKGROUND OF THE INVENTION

Feature vectors are often used in pattern recognition, and are mathematical ways of describing features about a pattern. For instance, speech data is commonly processed into speech feature vectors, which are then analyzed. Handwriting analysis and computer visual processing are other pattern recognition processes where feature vectors can be used.

For example, assume that a computer system is being programmed to visually distinguish between fruits. If the set of fruits is {banana, grapefruit, apple, watermelon}, the computer system could be programmed to examine the color, shape, and surface texture of the fruits. As a feature vector, this would be described as vectors having the elements of (color, shape, surface). For instance, a banana could have the feature vector (yellow, curved, smooth), while a grapefruit could have the feature vector of (red-orange, round, rough). Similarly, the feature vector for an apple could be (red, round, shiny), and the feature vector for a watermelon could be (dark green, oblong, smooth). Generally, the elements of each feature vector would be quantized so that a computer system can compare the feature vectors. Thus, the feature vector (yellow, curved, smooth) could be (−3, 0, 0), while the feature vector (red-orange, round, rough) could be (0, 1.5, 1).

One use for a feature vector is to determine into which class a sample feature vector falls. If the computer system is shown an apple that is slightly oblong, the system should be able to determine that the apple falls into the class that denotes apples. For instance, referring to FIG. 1, a three-dimensional class space 100 is shown. This three-dimensional class space 100 can be used by a system to determine if an unknown feature vector belongs to one of the classes. Three-dimensional space 100 comprises class 110 (corresponding to a banana), class 120 (corresponding to a grapefruit), class 130 (corresponding to an apple), and class 140 (corresponding to a watermelon). In this simplistic representation, the X axis corresponds to color, the Y axis to shape, and the Z axis to surface texture. A computer system could use this space to determine whether an unknown feature vector, such as unknown feature vector 150, belongs to one of the classes. As can be seen in FIG. 1, unknown feature vector 150 is closest to class 130, and thus is likely an apple.

Because each apple is slightly different than other apples, and each grapefruit is slightly different from other grapefruits, systems like this are "trained" by showing the system a number of bananas, grapefruit, apples, and watermelons. These data are used to develop classes, and the classes are generally not single points as shown in FIG. 1. Instead, the classes can be thought of as volumes and are usually shown through reference to means. Thus, classes 110 through 140 in FIG. 1 are class means 110 through 140, where each mean corresponds to a class. Determining classes can be quite complex, but it can be assumed for the purposes of FIG. 1 that classes can be determined.

Classes 120 and 130 are considered to be "confusable" because it is harder to determine into which class an unknown feature vector should be placed. In the example of FIG. 1, it is relatively easy to determine that unknown feature vector 150 belongs to class 130. Moving the unknown feature vector 150 just toward the X and Y axes could make it very hard to determine into which class 120 or 130 unknown feature vector 150 belongs.

While three-dimensional class space 100 is useful for simple feature vectors, additional processing is usually performed for feature vectors in many applications. This occurs because feature vectors can be quite large. For example, speech feature vectors commonly contain many elements.

One way of dealing with such large vectors is to reduce the dimensions of the feature vectors and process the reduced-dimension feature vectors. A common technique that does this is Linear Discriminant Analysis (LDA), which reduces the dimensions of the feature vectors while maintaining maximal discrimination. This has the benefits of providing reduced-dimension feature vectors while still allowing proper discrimination between feature vectors. This can have the effect of filtering out the "noise" features while still retaining the discriminative features. In the example of FIG. 1, color and shape are features that are highly discriminative of fruits, while texture is less discriminative. The process of LDA attempts to retain a high amount of discriminant information while reducing dimensions.

An exemplary reduced-dimension class space 200 is shown in FIG. 2. In FIG. 2, the class means 110 through 140 and unknown feature vector 150 have been reduced from three dimensions to two dimensions. A problem with current LDA is illustrated in FIG. 2, where classes 120 and 130 have been placed almost on top of each other, making it hard to determine into which class unknown feature vectors belong. In FIG. 1, it was easy to determine that unknown feature vector 150 belongs to class 130. In FIG. 2, however, it is unclear as to which class the unknown feature vector 150 belongs. Current LDA therefore can make confusable classes even more confusable in reduced-dimensional class space.

Thus, what is needed is a better way of performing LDA that overcomes the problem of increasing confusability of classes during a transformation of feature vectors to reduced-dimensional class space.

SUMMARY OF THE INVENTION

The present invention provides weighted pair-wise scatter to improve Linear Discriminant Analysis (LDA). This decreases confusability in reduced-dimensional class space, which increases discrimination and, thereby, increases the probability that a sample feature vector will be correctly associated with an appropriate class.

In general, the present invention determines and applies weights for class pairs. The weights are selected to better separate, in reduced-dimensional class space, the classes that are more confusable in normal-dimensional class space. During the dimension-reducing process, higher weights are preferably assigned to more confusable class pairs while lower weights are assigned to less confusable class pairs. As compared to unweighted LDA, the present invention will result in decreased confusability of class pairs in reduced-dimensional class space.

A more complete understanding of the present invention, as well as further features and advantages of the present invention, will be obtained by reference to the following detailed description and drawings.

DETAILED DESCRIPTION OF PREFERRED EMBODIMENTS

Figure 1:
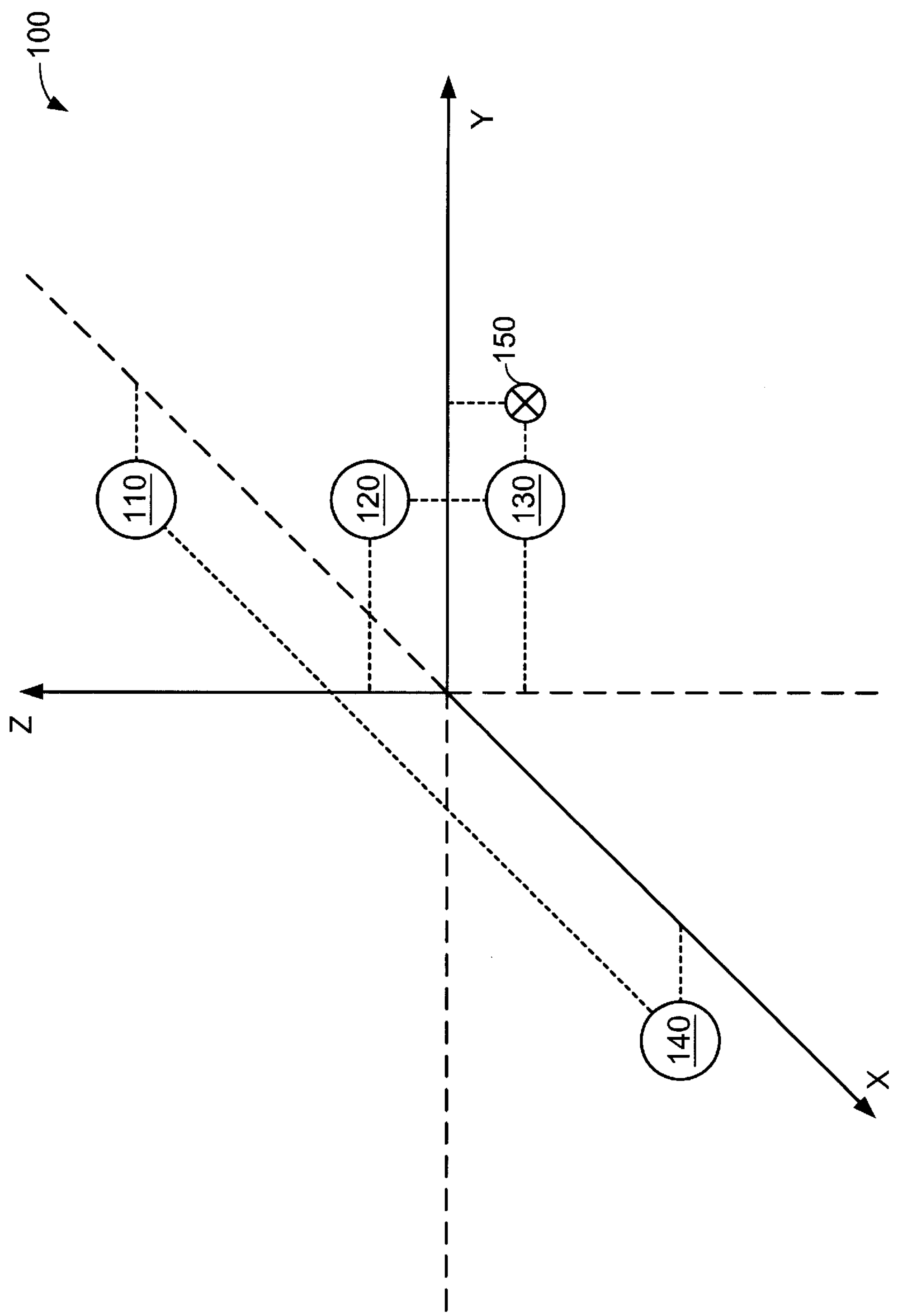
FIG. 1 is an exemplary three-dimensional class space.

Before proceeding with a detailed description, it is beneficial to review common LDA. Additionally, it is also beneficial to discuss, in more mathematical terms, problems with common LDA. The "Overview" section below discusses these topics. Those skilled in the art of LDA and who are familiar with the current problems of LDA may wish to proceed to the "Detailed Description" below.

Overview

For a more detailed discussion of conventional LDA techniques, see, e.g., Li et al., "Weighted Pairwise Scatter to Improve Linear Discriminant Analysis," International Conference of Spoken Language Process (ICSLP 2000), 2000, the disclosure of which is incorporated herein by reference. Generally, in order to reduce computation and to decrease the effects of dimensionality, it is common to apply LDA for statistical pattern classification tasks. The LDA transform attempts to reduce dimension with minimal loss in discrimination information. LDA is used for speech recognition as a part of the front-end processing, because the computational complexity in speech recognition highly depends on the dimension of the feature space. On the other hand, feature spaces of higher dimension enable the acoustic model to carry more discriminant information. In speech recognition, feature space dimension can be increased by extending the feature vector to include a range of neighboring frame data. Doing this will increase discrimination but computation becomes impractical. Applying LDA to the extended feature vector is very necessary.

The LDA problem is formulated as follows. Let $x \in \in^n$ be a feature vector. A transformation $y=\theta x$, $\theta: \in^n \rightarrow \in^p$, with $p<n$, is sought such that in the transformed space, minimum loss of discrimination occurs. In practice, p is much smaller than n.

Assume $\{x_i\}_{1 \leqq i \leqq N}$ are N training feature vectors, each labeled as belonging to a class $l_i \in \{1 \ldots K\}$. Let $N_k=\Sigma_l^{=k} 1$ be the number of training vectors in class k. Then, $\Sigma_{k=1}^{K} N_k = N$ is the total number of training samples. The following entities are defined:

$$\sum_k = \frac{1}{N_k} \sum_{l_i=k} (x_i - \mu_k)(x_i - \mu_k)^T = \frac{1}{N_k} \sum_{l_i=k} x_i x_i^T - \mu_k \mu_k^T, \text{ and}$$

$$\sum = \frac{1}{N} \sum_{i=1}^{N} (x_i - \mu)(x_i - \mu)^T = \frac{1}{N} \sum_{i=1}^{N} x_i x_i^T - \mu\mu^T,$$

where $\mu_k$ is the sample mean for class k, $\mu$ is the global sample mean, $\Sigma_k$ is the covariance matrix for class k and $\Sigma$ is the total covariance matrix. In some literature, scatter matrices are used. This is a technique used, for instance, in Duda et al., "Pattern Classification and Scene Analysis," John Wiley & Sons, New York, 1973, the disclosure of which is incorporated by reference herein. Essentially, the scatter matrices are equivalent to covariance matrices except by a factor. The total scatter matrix is defined as:

$$T = \sum_{i=1}^{N} (x_i - \mu)(x_i - \mu)^T$$

$$T = \sum_{i=1}^{N} ((x_i - \mu_{l_i})(x_i - \mu_{l_i})^T + (\mu_{l_i} - \mu)(\mu_{l_i} - \mu)^T)$$

$$T = N_k \sum_k + \sum_{i=1}^{N} N_k (\mu_k - \mu)(\mu_k - \mu)^T$$

In classical LDA, the first term $W=\Sigma_{i=1}^{K} N_k \Sigma_k$ is called within-class scatter matrix, and the second term $B=\Sigma_{l=1}^{K} N_k (\mu_k-\mu)(\mu_k-\mu)^T$ is called between class scatter matrix. If $\theta$, commonly called a transformation matrix, is a linear projection, then in the new feature space the within-class scatter and between-class scatter become $\theta W \theta^T$ and $\theta B \theta^T$, respectively.

It is popularly accepted that the between-class scatter carries the discriminant information. The idea of LDA is to maximize in some sense the ratio of between-class and within-class scatter matrices after transformation. This will enable one to choose a transform that keeps the most discriminative information while reducing the dimensions. Precisely, one wants to maximize the objective function:

$$\max_\theta \frac{|\theta B \theta^T|}{|\theta W \theta\, T|} \quad \text{(Eq. 1)}$$

Fortunately, as is well known, there is a close solution to this optimization problem. The columns of the optimum $\theta$ are the relative generalized eigenvectors corresponding to the first p maximal magnitude eigenvalues of the equation:

$$Bv = \lambda W v \quad \text{(Eq. 2)}$$

The following form of the between-class covariance matrix is taken for granted in the literature:

$$B = \sum_{i=1}^{K} N_k (\mu_k - \mu)(\mu_k - \mu)^T \quad \text{(Eq. 3)}$$

This is a measure of how distributed the means of each class are from the center. Intuitively, it is better to have a "bigger" value of B since it shows that the classes are more spread out in the transformed space, and thus easier to discriminate them. From this expression, it is not clear how the classes are discriminated from each other pair-wise. To illustrate this point, consider the following example.

Suppose there are four classes in $\in^2$, each of them having same number of feature vectors and equal variance. Let their means be:

$\mu_1=(1,\delta)$ $\mu_2=(-1,\delta)$ $\mu_3=(-1,-\delta)$ $\mu_4=(1,-\delta)$

In this case, the between-class scatter matrix is:

$$\frac{1}{4}B=\begin{pmatrix}1 & 0\\ 0 & \delta^2\end{pmatrix}\to\begin{pmatrix}1 & 0\\ 0 & 0\end{pmatrix}$$

When $\delta\to 0$, the between-class scatter matrix does not contain any discrimination in the vertical direction. The only discrimination is in the horizontal direction. It can be said that the between class scatter matrix is dominated by the covariance of the class pairs other than (1,4) and (2,3). Regarding this classification problem, the covariance of class pairs (1,4) and (2,3) are more important than others since they are more confusable, yet the conventional between-class scatter obviously does not capture this information. Therefore, the canonical method of determining B does not accurately represent the desired discrimination information.

From the above example, it can be seen that if there are some classes that are much closer as compared to others, the between-class scatter matrix mostly ignores the discriminatory information between these classes. The end result of this is more errors during pattern recognition.

DETAILED DESCRIPTION

The present invention decreases errors during pattern recognition by determining and applying weights for class pairs, which should effectively decrease confusability of classes in reduced-dimension class space. When training a pattern recognition system, a number of classes will be determined. Each class pair of classes will be assigned a weight. During the Linear Discriminant Analysis (LDA) process, a number of matrices are determined. As describe above, a within-class scatter matrix, W, and a weighted between-class scatter matrix, $B_w$, are determined, and these two matrices are used to determine a transformation matrix, $\theta$. These matrices are generally determined during training. After training, the transformation matrix is used to reduce the dimensions of a feature vector.

The weights of the present invention affect the between-class scatter matrix, which changes elements of the transformation matrix and ultimately affects how feature vectors are mapped into reduced-dimension class space. The new between-class scatter matrix will be called the weighted between-class scatter matrix to reduce confusion between it and a normal between-class scatter matrix used in normal LDA. The weights are selected to reduce confusability. The class pairs that are more confusable are assigned a higher weight, and the class pairs that are less confusable are assigned a lower weight. The transformation matrix should reflect these changes and, consequently, decrease confusability, in reduced-dimension class space, for class pairs that are confusable in normal-dimension class space. It should be noted that this "decrease" in confusability in reduced-dimension class space is relative to normal LDA. It is possible that a class pair in normal-dimension class space is less confusable than the same class pair in reduced-dimension class space, even when using embodiments of the present invention. In other words, confusability for the class pair increased during transformation from the normal-dimension class space to the reduced-dimension class space. However, that same class pair should be less confusable in reduced-dimension class space, when using embodiments of the present invention, than the class pair will be if normal LDA were used.

The "normal-dimension class space" is the space determined by the number of dimensions in a feature vector. For example, speech processing systems commonly have original feature vectors that have 24 dimensions. To achieve more discriminative information, nine consecutive (in time) feature vectors are concatenated, which results in a 216-dimensional feature vector. The normal-dimension class space is then 216 dimensions. The "reduced-dimension class space" is the space determined by the dimensions of the reduced-dimension feature vectors. In many speech processing systems, for instance, LDA is applied to the 216-dimension feature vectors to create 40-dimension feature vectors. In this-way, LDA allows the use of more frame features without sacrificing speed.

In general, weights may be assigned through a monotonically increasing function of confusability, in which higher weights would be assigned to class pairs that are more confusable. More specifically, the weights can be assigned through a monotonically decreasing function of distance, which assigns lower weights to class pairs that are separated by larger distances. These statements are related because classes that are separated by longer distances are less confusable. Thus, the more confusable two classes are, in general, the closer they will be in class space. Even though these two statements are usually related, there could be situations, depending on the confusability measure being used, when increasing distance between two classes may not equate with decreasing confusability. Distances are usually measured through reference to means of classes. This is described in more detail below. There are a variety of ways of determining confusability of classes, and some of these may not depend on distance between classes. Thus, there could be situations where a decrease in confusability, as measured by a particular confusability metric, may not equate with an increase in distance (and vice versa) between the means of the two classes being measured. Nonetheless, decreasing the distances between the means of two classes generally does result in an increase in confusability.

Figure 2:
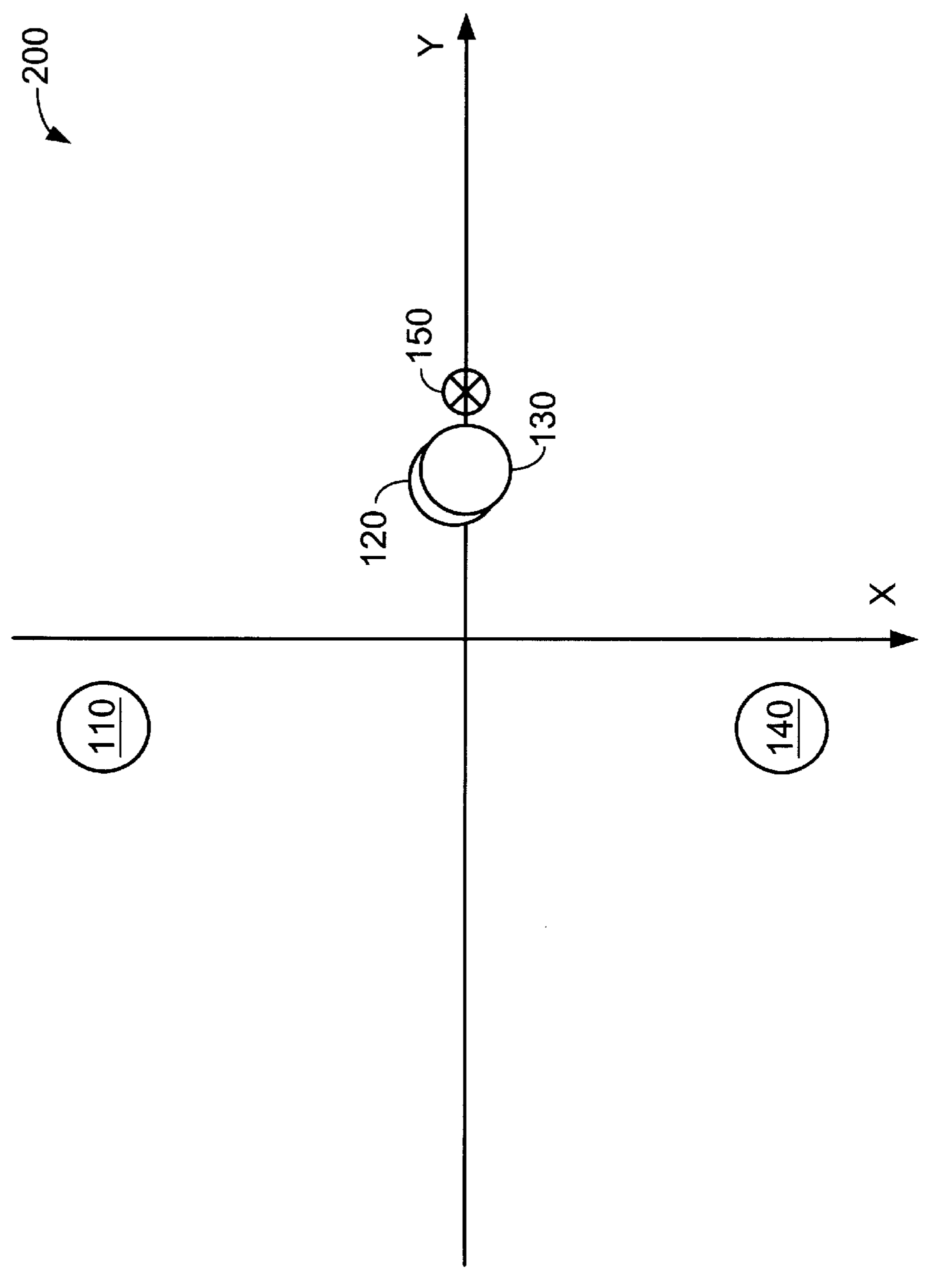
FIG. 2 is an exemplary two-dimensional, reduced-dimension class space that results from a prior art Linear Discriminant Analysis (LDA)
Figure 3:
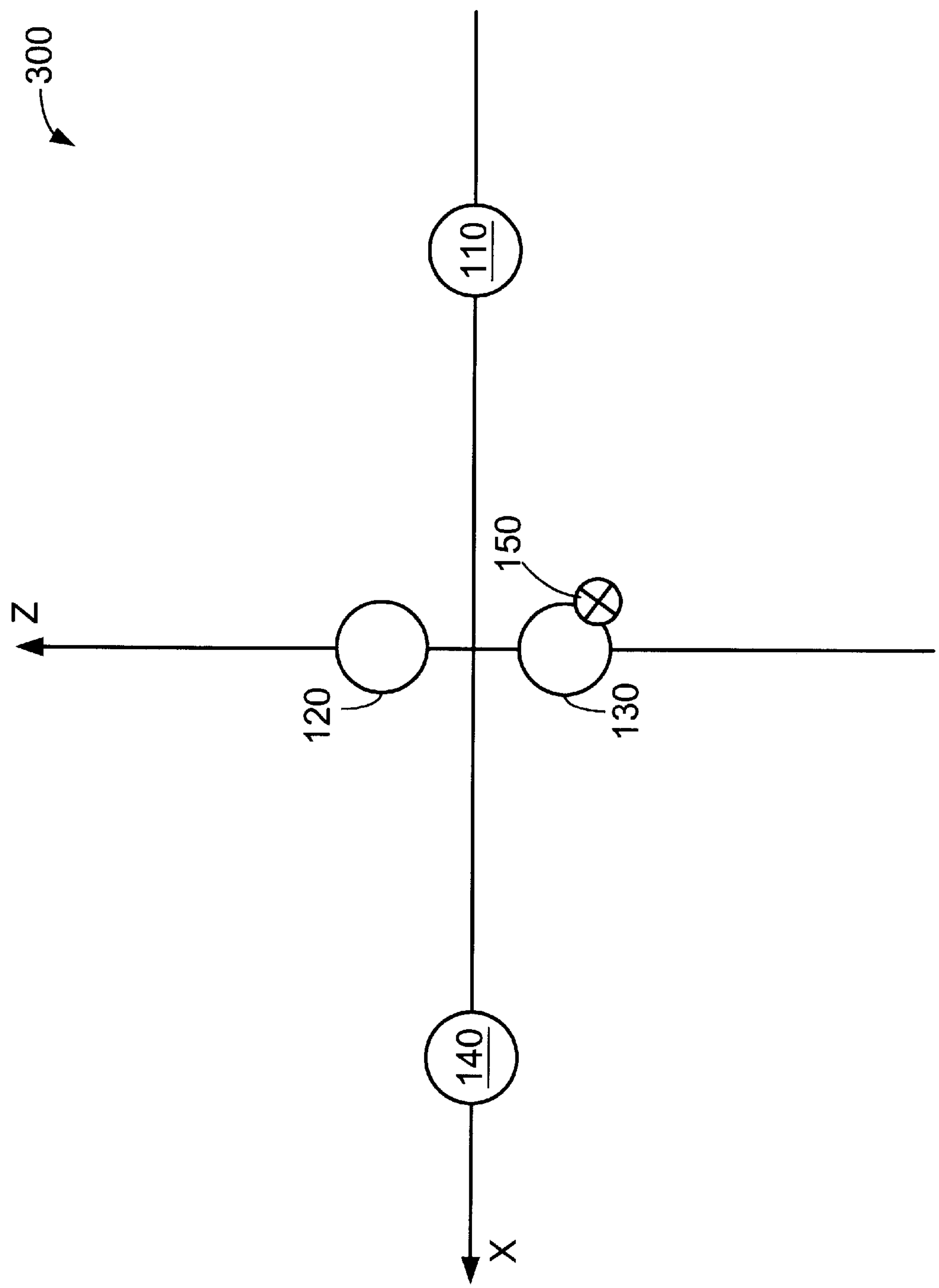
FIG. 3 is an exemplary two-dimensional, reduced-dimension class space that results from an LDA in accordance with one embodiment of the present invention.

Referring now to FIG. 3, an exemplary reduced-dimension class space 300 is shown that could result when using embodiments of the present invention. This class space 300 is similar to the reduced-dimension class space 200 of FIG. 2, and should be compared with FIG. 2 (a figure representing prior art LDA). In this class space 300, classes 120 and 130 should not lay on top of each other. Instead, because transformation with the present invention preferentially increases distances between confusable classes, classes 120 and 130 should be separated. This allows the unknown feature vector 150 to be appropriately associated with class 130 instead erroneously associated with class 120. This is in marked contrast to classes 120 and 130 of FIG. 2, which were basically on top of each other and indistinguishable. Thus, the present invention should allow for better class separation in reduced-dimension class space.

Figure 4:
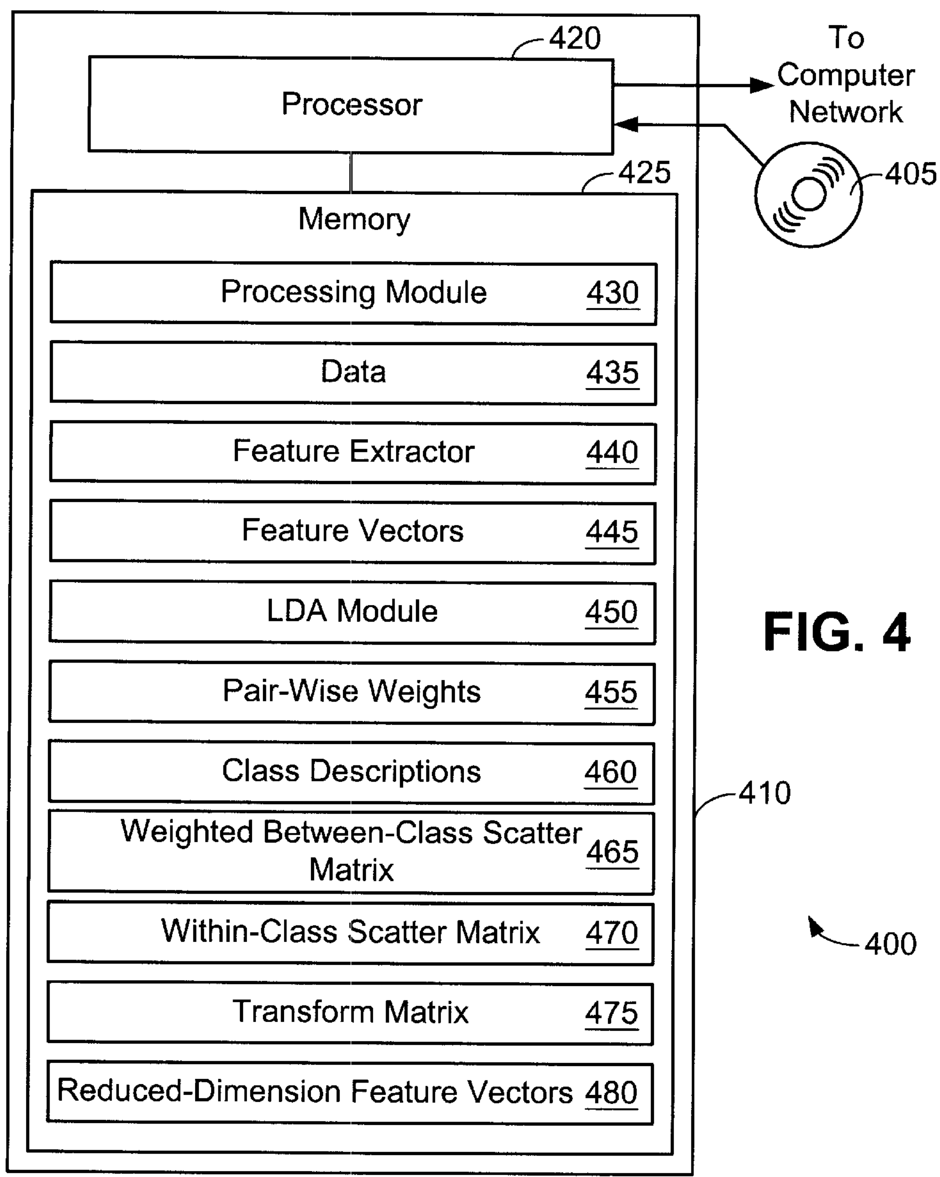
FIG. 4 is a block diagram of a system that performs LDA in accordance with one embodiment of the present invention.

Referring now to FIG. 4, this figure shows a block diagram of an exemplary pattern recognition system 400 for performing LDA in accordance with an embodiment of the present invention. Pattern recognition system 400 comprises a computer system 410 that can communicate with a computer network or accept programming information from compact disk 405.

As is known in the art, the methods and apparatus discussed herein may be distributed as an article of manufacture that itself comprises a computer-readable medium, such as compact disk 405, having computer-readable code means embodied thereon. The computer-readable program code means is operable, in conjunction with a computer system, to carry out all or some of the steps to perform the methods or create the apparatuses discussed herein. The computer-readable medium may be a recordable medium (e.g., floppy disks, hard drives, compact disks, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable program code means is any mechanism for allowing a computer to read instructions and data, such as magnetic variations on a magnetic medium or height variations on the surface of a compact disk.

Computer system 410 comprises a processor 420 and a memory 425. Memory 425 comprises processing module 430, data 435, feature extractor 440, feature vectors 445, LDA module 450, pair-wise weights 455, class descriptions 460, weighted between-class scatter matrix 465, within-class scatter matrix 470, transform matrix 475 and reduced dimension feature vectors 480. It should be noted that all of the elements do not have to exist in memory at one time. FIG. 4 merely helps to explain the present invention. Computer system 410 could be any device capable of performing the present invention. In general, computer system 410 will be a personal computer, but could be a personal digital assistant, a workstation, a server, or an application-specific integrated circuit.

Memory 425 will configure the processor 420 to implement the methods, steps, and functions disclosed herein. The memory 425 could be distributed or local and the processor 420 could be distributed or singular. The memory 425 could be implemented as an electrical, magnetic or optical memory, or any combination of these or other types of storage devices. Moreover, the term "memory" should be construed broadly enough to encompass any information able to be read from or written to an address in the addressable space accessed by processor 420. With this definition, information on a network is still within memory 425 of computer system 410 because the processor 420 can retrieve the information from the network. It should be noted that each distributed processor that makes up processor 420 will generally contain its own addressable memory space.

Processing module 430 is a module that can perform any or all steps of methods described herein. Generally, processing module 430 will be a pattern recognition engine, such as a speech recognition engine, and the method disclosed herein will be incorporated into the processing module 430. As such, processing module 430 directs computer system 410 perform pattern recognition.

Data 435 is the data that will have features extracted from it. This could be any information on which pattern recognition could be performed, but will usually be handwriting, speech or visual information. Feature extractor 440 extracts feature vectors 445 from the data 435. The feature extractor 440 could be part of processing module 430, or could separately exist from processing module 430, as shown in FIG. 4. The feature vectors 445, as is known in the art, are mathematical vectors that help to describe patterns. The feature vectors will have a number of dimensions. For instance, speech feature vectors commonly have 39 or 40 dimensions. The normal-dimension class space will have the same number of dimensions. Classes will be determined in this normal-dimension class space, and are usually determined during training. It is also possible to update class descriptions as time passes.

The LDA module 450 is a module that performs LDA. Generally, this will be part of processing module 430, although it could be separate as shown in FIG. 4. During normal use, LDA module 450, generally under direction of processing module 430, will accept feature vectors 445 and reduce the dimension of these feature vectors to create reduced-dimension feature vectors 445. The LDA module uses transformation matrix 475 to transform normal-dimension feature vectors to reduced-dimension feature vectors. It should be noted that the LDA module 450 can operate on large feature vectors that are made from smaller feature vectors. In speech recognition, for example, it is common to put nine feature vectors into one large feature vector and then apply LDA to reduce the dimensions of the large feature vector.

During training, the transformation matrix 475 is created. If desired, transformation matrix 475 may also be periodically updated. The transformation matrix 475 is determined as described above in reference to Equations 1 and 2. To determine the transformation matrix 475, several other entities must be determined. Notable, the pair-wise weights 455, class descriptions 460, weighted between-class scatter matrix 465 and within-class scatter matrix 470 must be determined.

The pair-wise weights 455 are determined by weighting different class pairs to improve confusability or increase distance between classes after the subsequent transformation to reduced-dimension class space. Again, it is important to note that the improvement in confusability or increase in distance is relative to LDA performed without the present invention. Different methods for determining weights will be described below in more detail in reference to FIG. 6. The weights 455 will be applied to the weighted between-class scatter matrix 465.

Class descriptions 460 are data that describe a class. The actual ways that classes are determined can be quite complex and beyond the scope of this disclosure. For the purposes of the present invention, the class descriptions 460 should have a probability distribution for each class, which includes a sample mean for each class.

Weighted between-class scatter matrix 465 is similar to matrix B as described above in reference to Equation 3. The weighted between-class scatter matrix 465 of the present invention takes into account pair-wise weights 455. This is described in more detail below in reference to FIG. 6.

The within-class scatter matrix 470 is preferably not affected by the present invention. As described above in reference to Equations 1 and 2, the weighted between-class scatter matrix 465 (in place of B, the normal between-class scatter matrix) and the within-class scatter matrix 470 are used to determine transformation matrix 475. The weights calculated by the present invention are applied to the weighted between-class scatter matrix 465, which are then applied to the transformation matrix 475. The transformation matrix 475 thus has different elements than does a transformation matrix made by normal LDA processing.

Reduced-dimension feature vectors 480 result from LDA processing, by LDA module 450, on the feature vectors 445.

Some benefits of the pattern recognition system 400 of FIG. 4 are that the weight derivation is done during training but the LDA performed during steady state processing is no more complex than normal LDA, and that the present invention results in decreased confusability, as compared to normal LDA, of classes in reduced-dimension class space.

Figure 5:
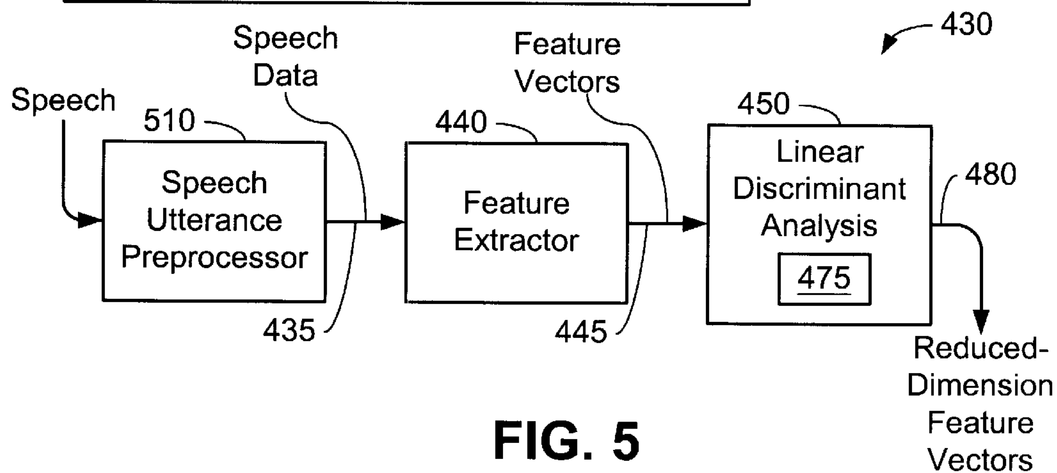
FIG. 5 is a block diagram of an exemplary speech processing system in accordance with one embodiment of the present invention.

Turning now to FIG. 5, this figure shows an exemplary block diagram of a processing module 430 that processes speech. Speech processing module 430 comprises a speech utterance preprocessor 510, a feature extractor 440 and an LDA module 450. LDA module 450 comprises a transformation matrix 475. The speech processing module 430 has used training data to train acoustic models which are used during real-time decoding operations. The processing module 430 is shown configured for real-time decoding.

The speech utterance preprocessor 510 receives speech and generates representative speech waveforms, i.e., speech data 435. The speech utterance preprocessor 510 may include, for example, an audio-to-analog transducer (microphone) and an analog-to-digital converter that respectively transduce the utterances into an electrical signal and then convert the electrical signal into a digital signal representative of the uttered speech. Further, the preprocessor 510 may sample the speech signal and partition the signal into overlapping frames so that each frame is discretely processed by the remainder of the system. The output signal of the preprocessor 510 is the sampled speech waveforms or speech data 435 that is recorded and provided to a feature extractor 440.

The feature extractor 440 receives the speech data 435 and, as is known in the art, extracts spectral features from the signal at regular intervals, for example, about every 10 milliseconds. The spectral features are in the form of feature vectors 445 that are then passed on to LDA module 450. As is also known in the art, the feature vectors 445 representing training data may be used to train acoustic models such as, for example, band-quantized Gaussian mixture models, which are then used by the system to decode speech data 435 received during the course of a real-time application.

LDA module 450 applies the transformation matrix 475 to the incoming feature vectors 445 and creates reduced-dimension feature vectors 480. These reduced-dimension feature vectors can be further processed by additional elements (not shown) of the processing module 435 to turn speech into text.

Figure 6:
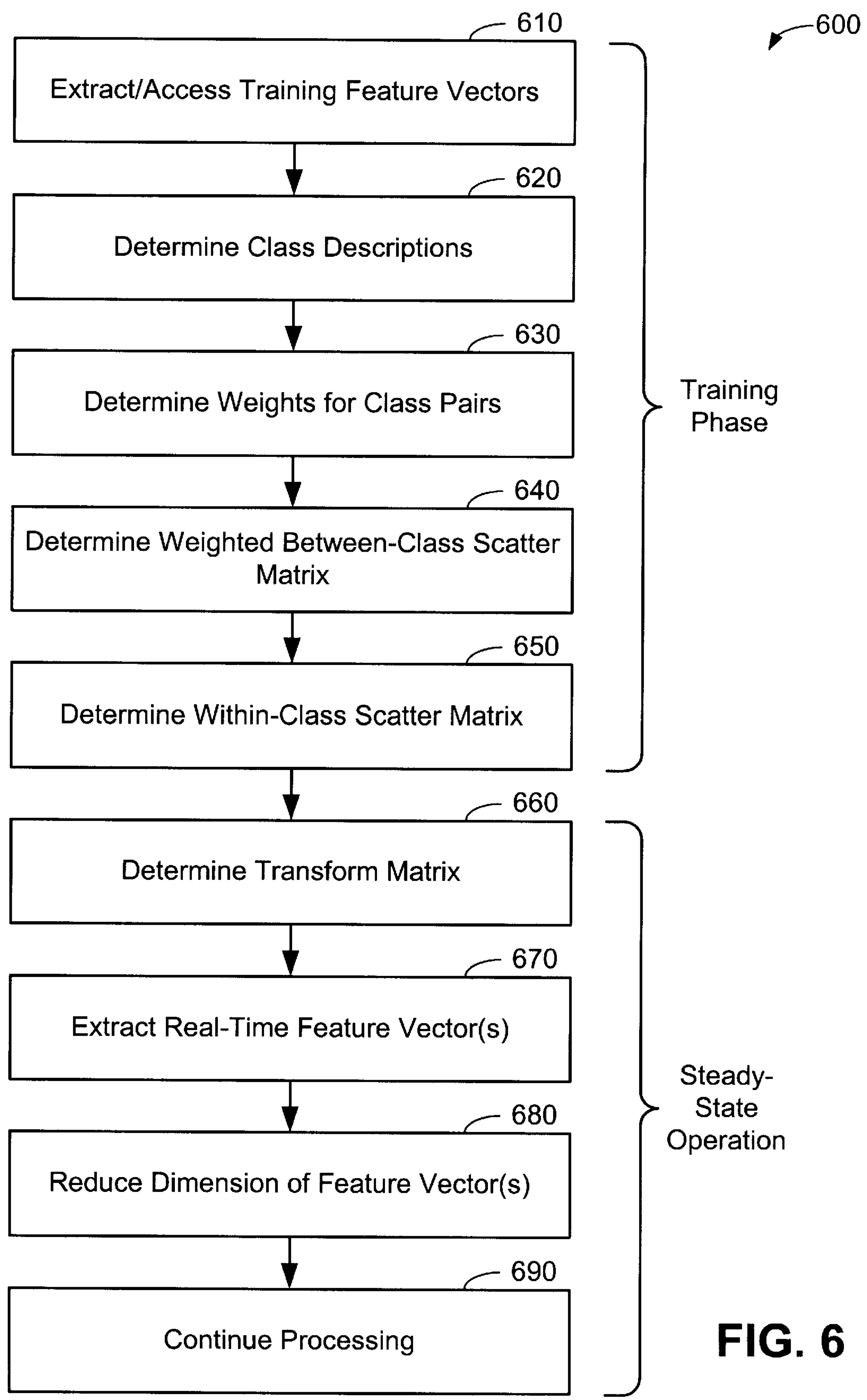
FIG. 6 is a method for LDA in accordance with one embodiment of the present invention.

Referring now to FIG. 6, this figure shows a flowchart of a method 600 for pattern recognition in accordance with one embodiment of the present invention. Method 600 is used both during training and during steady-state operation of a pattern recognition system. Steps 610 through 650 are generally performed during training and steps 660 through 680 are performed during steady-state operation. Method 600 is used to determine and apply class-pair weights to improve LDA.

Method 600 begins when training feature vectors are extracted and accessed. Generally, in systems such as speech processing systems, training involves having multiple speakers speak for a period of time (or using digital copies of speech) and determining various information used for subsequent pattern recognition. The training feature vectors are accessed and processed.

In step 620, class descriptions are determined. Class descriptions will usually be determined after a number of feature vectors have been processed, although generic class descriptions could already exist. In the latter situation, the generic class descriptions would be modified through training, which could include defining additional classes. As previously discussed, determining classes can be a complex process. Class descriptions could involve determining a sample distribution for each class, a probability distribution for each class, a sample mean for each class, numbers of classes, and number of samples. The class descriptions will be used in later processing steps. In particular, elements of the class descriptions will be used to determine the weighted between-class scatter matrix, the weights and the within-class scatter matrix.

In step 630, weights are determined for class pairs and, in step 640, the weighted between-class scatter matrix is determined. The weighted between-class scatter matrix of the present invention may be thought of as a sum of weighted "pair-wise scatter" matrices and is defined as follows:

$$B_w = \frac{1}{2N}\sum_{k,l=1}^{K} w_{kl}N_kN_l(\mu_k-\mu_l)(\mu_k-\mu_l)^T, \qquad \text{(Eq. 4)}$$

where $\{W_{kl}\}$ is a set of weights. Each $W_{kl}$ is a non-negative weight assigned to class pair (k,l). Each $W_{kl}$, thus, represents how important it is to discriminate class k from class l. It should be noted that Equation 4 will result in K terms (same as the conventional between-class scatter matrix) and k is never equal to l.

At first glance, there does not seem to be much of a relationship between Equation 3 (a normal between-class scatter matrix) and Equation 4 (the weighted between-class scatter matrix 465 of the present invention). The following discussion shows the relationship between these. Assume uniform weights for each class pair, i.e., $W_{kl}=1$. In other words, each pair-wise scatter contributes equally to the weighted between-class scatter matrix. The "$B_{uniform}$" matrix that results will be:

$$\begin{aligned} B_{uniform} &= \frac{1}{2N}\sum_{k,l=1}^{K} N_kN_l(\mu_k-\mu_l)(\mu_k-\mu_l)^T \\ &= \frac{1}{2N}\sum_{k,l=1}^{K} N_kN_l(\mu_k-\mu+\mu-\mu_l)(\mu_k-\mu+\mu-\mu_l)^T \\ &= \sum_{k=1}^{K} N_k(\mu_k-\mu)(\mu_k-\mu)^T = B \end{aligned}$$

Thus, if uniform weight is used in the weighted between-class scatter matrix 465 of the present invention, the new weighted between class scatter matrix (Equation 4) is exactly the same as conventional between-class scatter matrix (Equation 3). Therefore, it turns out that the definition of $B_w$ is a generalization of the conventional between-class scatter matrix.

With this new definition of weighted between class scatter matrix 465, it can be seen why a conventional between-class scatter matrix ignores the information about the pairs of classes that are close to each other (as described in the Overview section above). In the expression of $B_{uniform}$, the pair-wise scatters are merely summed in $(\mu_k-\mu_l)(\mu_k-\mu_l)^T$. It is in favor of those class pairs (k, l) with large $(\mu_k-\mu_l)$, because later a relative eigenvector of $Bv=\lambda Wv$ with a relatively bigger eigenvalue is searched. It is unlikely that the contribution from pair (k',l') can compete with the contribution from pair (k, l) if $(\mu_{k'}-\mu_{l'})$ is much smaller compared with $(\mu_k-\mu_l)$. If such a situation happens, the discriminant information between classes k' and l' is lost. In fact, what is desired is the opposite effect, which is the classes that are closer (or more confusable) should be weighted more for maximum discrimination.

In order to keep enough discriminant information, the weights need to be adjusted. Any function that decreases confusability or distance, in the reduced-dimension class space, may be used. Some different weighting functions will now be discussed. A natural candidate is a normalization weight equal to the square of the inverse of the Euclidean distance between class means:

$$w_{kl} = \frac{1}{\|\mu_k - \mu_l\|^2} = \frac{1}{(\mu_k - \mu_l)^T(\mu_k - \mu_l)}$$

This equation thus weights the classes that have their means closer to each other more than the ones that have means farther apart. In this sense, more confusable classes are weighted more and less confusable classes are weighted less. This equation is a monotonically decreasing function of distance, where the distance is measured between the two class means. According to the normalization weight, the weighted between class scatter matrix 465 is:

$$B_{norm} = \frac{1}{2N}\sum_{k,l=1}^{K} N_k N_l \frac{(\mu_k - \mu_l)(\mu_k - \mu_l)^T}{(\mu_k - \mu_l)^T(\mu_k - \mu_l)}. \quad \text{(Eq. 5)}$$

It is interesting to compare Equation 5 with the problem discussed in the Overview section. For the problem defined in the Overview section, the conventional between-class covariance computed using the weighted between-class scatter matrix 465 of Equation 5 is now as follows:

$$\frac{1}{4}B_{norm} = \begin{pmatrix} 1 + \frac{1}{1+\delta^2} & 0 \\ 0 & 1 + \frac{\delta^2}{1+\delta^2} \end{pmatrix} \to \begin{pmatrix} 2 & 0 \\ 0 & 1 \end{pmatrix}$$

So, using the new weighted between-class scatter matrix, of Equation 5, no matter how close the pairs (1,4) and (2,3) are, their spread will be accounted for when computing the weighted pair-wise scatter LDA. This is very desirable regarding the classification problem, and it is an improvement over LDA that uses a conventional between-class scatter matrix.

It is possible to use other weights. For instance, to emphasize the discriminant information for those classes close to each other, the square of the previous weights may be used:

$$w_{kl} = \frac{1}{((\mu_k - \mu_l)^T(\mu_k - \mu_l))^2}$$

With these weights, the weighted between-class scatter matrix of the example in the Overview section is $$4B_w = \begin{pmatrix} 1 + \frac{1}{(1+\delta^2)^2} & 0 \\ 0 & \frac{1}{\delta^2} + \frac{\delta^2}{(1+\delta^2)^2} \end{pmatrix} \to \begin{pmatrix} 2 & 0 \\ 0 & +\infty \end{pmatrix}$$

So the closer are the class pairs (1,4) and (2,3), the more this equation theoretically takes them into account.

Actually, any decreasing function of a distance measure can be applied as the weight, i.e., $w_{kl}=f(d(k, l)$, where d(k, l) is a metric between two classes k and l and f(•) is a monotonically decreasing function in $\in^+$. For example, in the above choices, the metric $d(k, l)=\|\mu_k-\mu_l\|$ and functions $f(t)={}_{t2/}{}^1$ or $f(t)={}_{t4/}{}^1$ were used.

The weights introduced above do not consider the within class covariances of each class in computing the distance between them. The variance can be a factor in discriminating two classes. Thus, it makes sense to use a distance measure that incorporates the covariance. When each class is assumed to be normally distributed, we can compute Kullback-Leibler distance (Cover et al., "Elementary Information Theory," John Wiley & Sons, Inc., New York, 1991, the disclosure of which is incorporated by reference herein) or divergence between them and use it in the weights as follows:

$$w_{kl}=f(D(P_k\|P_l))$$

where $P_k$ represents the Gaussian distribution for class k and D(P||Q) is the KL distance between two Gaussians and f(•) represents a monotonically decreasing function. It is possible to use diagonal covariances for computational simplicity.

In step 650, the within-class scatter matrix 470 is determined. As discussed in the Overview section, the within-class scatter matrix 470 is $W=\Sigma_{i=l}^{K}N_k\Sigma_k$. Once the within-class scatter matrix 470, W, and the weighted between-class scatter matrix 460, $B_w$, have been determined, the transformation matrix 475 can be determined (step 660). As discussed in the Overview section in reference to Equations 1 and 2, the function $$\max_\theta \frac{|\theta B_w \theta^T|}{|\theta W \theta^T|}$$

is maximized. This can be solved, as described in the Overview section, through the generalized eigenvector problem $B_w v=\lambda Wv$. Once the transform matrix 475, θ, has been determined, it can be used in LDA.

The previous steps are generally performed during training. After training, the transformation matrix is fixed (but can be updated), and is applied to feature vectors. The following steps occur during real-time operations. In step 670, a real-time feature vector is extracted from pattern data. Generally, a feature extractor is used to extract a feature having a predetermined number of dimensions. It is also possible that a number of such feature vectors are combined into a larger feature vector that is then transformed.

In step 680, the transformation matrix is used to transform the feature vector into a reduced-dimension feature vector. As explained in the Overview section, this uses the equation y=θx, where y is the reduced-dimension feature vector and x is the original feature vector.

The reduced-dimension feature vector that results should be easier to place in a class in reduced-dimension class space because the transformation maintains better separation between classes in reduced-dimension class space.

In step 690, the system performs the other steps necessary to recognize patterns. For instance, for speech recognition, step 690 could comprise having a hypothesis search routine hypothesize a sequence of words from an acoustic vocabulary and computing a score for the hypothesis.

It can be shown that the weighted pair-wise scatter LDA of the present invention is an improvement over conventional LDA. Using a Euclidean weighting function (the inverse of the Euclidean distance between class pairs) seems to be the easiest and best weighting function, but other weighting functions, such as the Kullback-Leibler distance and a squared Euclidean distance weighting function (the inverse of the square of the Euclidean distance between class pairs), also offer improvement over conventional LDA.

It is to be understood that the embodiments and variations shown and described herein are merely illustrative of the principles of this invention and that various modifications may be implemented by those skilled in the art without departing from the scope and spirit of the invention. For instance, weights may be based on confusability metrics: It might be possible to improve the performance of the LDA of the present invention by considering N-best confusability between classes and modeling classes with a Gaussian mixture distribution instead of single Gaussian distribution.

What is claimed is:

1. A method to improve linear discriminant analysis, the method comprising the steps of:

extracting a plurality of feature vectors from data;

determining a plurality of classes from the feature vectors; and determining a weight associated with each class pair of the classes.

2. The method of claim 1, wherein the step of determining a weight comprises the step of assigning each weight by using a monotonically decreasing function of distance, wherein class pairs with less distance between classes are assigned higher weight and class pairs with greater distance between classes are assigned lower weight.

3. The method of claim 2, further comprising the step of determining a mean for each of the classes, and wherein the step of step of assigning each weight by using a monotonically decreasing function comprises the step of assigning each weight by determining an inverse of a Euclidean distance between a mean of one of the classes and a mean of another of the classes.

4. The method of claim 2, further comprising the step of determining a mean for each of the classes, and wherein the step of step of assigning each weight by using a monotonically decreasing function comprises the step of assigning each weight by determining a square of an inverse of a Euclidean distance between a mean of one of the classes and a mean of another of the classes.

5. The method of claim 2, further comprising the step of determining a probability distribution for each class and wherein the step of assigning each weight by using a monotonically decreasing function comprises the step of assigning each weight by determining a monotonic function of a Kullback-Leiber distance for probability distributions of two of the classes.

6. The method of claim 1, wherein the step of determining a weight comprises the step of assigning each weight by using a monotonically increasing function of confusability, wherein class pairs that are more confusable are assigned higher weight and class pairs that are less confusable are assigned lower weight.

7. The method of claim 1, further comprising the steps of:

determining a mean for each class;

determining a matrix comprising terms determined by using the weights;

extracting a real-time feature vector; and determining a reduced-dimension feature vector from the real-time feature vector by using the matrix.

8. The method of claim 7, wherein the real-time feature vector comprises a plurality of other smaller real-time feature vectors and wherein each of the feature vectors comprises a plurality of smaller feature vectors.

9. The method of claim 7, wherein the step of determining a matrix comprising terms comprises the step of determining a weighted between-class scatter matrix, and wherein each term of the weighted between-class scatter matrix is a result of a multiplication comprising one of the weights for a corresponding class pair and a difference between means for each of two classes of the corresponding class pair.

10. The method of claim 9, wherein:

the method further comprises the step of determining a within-class scatter matrix;

the step of determining a matrix comprising terms determined by using the weights comprises the step of determining a transformation matrix from the between-class and within-class scatter matrices;

the step of determining a reduced-dimension feature vector comprises the step of multiplying a feature vector by the transformation matrix to determine the reduced-dimension feature vector.

11. The method of claim 10, wherein the step of determining a transformation matrix comprises the step of determining columns of the transformation matrix by determining a predetermined number of maximal magnitude eigenvalues, the eigenvalues determined when solving an equation of the weighted between-class scatter matrix multiplied by a vector equals an eigenvector multiplied by the within-class matrix and by the vector.

12. The method of claim 1, wherein:

the step of extracting a plurality of feature vectors from data comprises the steps of:

extracting a plurality of speech feature vectors from speech data; and combining a number of consecutive-in-time speech feature vectors into a large feature vector, thereby creating a plurality of large feature vectors; and the step of determining a plurality of classes from the feature vectors comprises the step of determining a plurality of classes from the large feature vectors.

13. The method of claim 12, wherein there are a plurality of class pairs and a plurality of weights, and wherein the method further comprises the steps of:

determining a between-class scatter matrix comprising entries, each entry determined from one of the weights and additional terms;

determining a within-class scatter matrix;

determining a transformation matrix from the within-class and between-class scatter matrices;

combining a number of consecutive-in-time real-time speech feature vectors into a large real-time speech feature vector; and determining a reduced-dimension feature vector from the large real-time speech feature vector by using the transformation matrix.

14. The method of claim 1, further comprising the steps of:

determining a plurality of elements, each element determined from one of the weights multiplied by additional terms; and determining a between-class scatter matrix comprising the plurality of elements.

15. The method of claim 14:

wherein the method further comprises the steps of:

determining a mean for each of the classes;

determining a number of training vectors for each of the classes;

wherein the step of determining a plurality of elements comprises the steps of:

selecting a class pair;

determining an element for the class pair by multiplying a corresponding weight for the class pair by the number of training vectors for a first of the classes of the class pair, by a number of training vectors for a second of the classes of the class pair, and by a square of the norm of the difference between a mean of the first class and a mean of the second class; and repeating the steps of selecting a class pair and determining an element for the class pair until all class pairs have been selected.

16. The method of claim 15:

wherein the square of the norm of the difference between a mean of the first class and a mean of the second class is determined by multiplying a first difference between the mean of the first class and the mean of the second class by a transpose of the first difference; and wherein the step of determining a plurality of elements further comprises the step of dividing an element by two times a total number of training samples.

17. A system to improve linear discriminant analysis, the system comprising:

a memory that stores computer-readable code; and a processor operatively coupled to the memory, the processor configured to implement the computer-readable code, the computer-readable code configured to:

extract a plurality of feature vectors from data;

determine a plurality of classes from the feature vectors;

and determine a weight associated with each class pair of the classes.

18. The system of claim 17, wherein the computer-readable code is further configured to, when determining the weight, assign each weight by using a monotonically decreasing function of distance, wherein class pairs with less distance between classes are assigned higher weight and class pairs with greater distance between classes are assigned lower weight.

19. The system of claim 18, wherein the computer-readable code is further configured to determine a mean for each of the classes, and further configured to, when assigning each weight by using a monotonically decreasing function, assign each weight by determining an inverse of a Euclidean distance between a mean of one of the classes and a mean of another of the classes.

20. The system of claim 18, wherein the computer-readable code is further configured to, when determining the weight, assign each weight by using a monotonically increasing function of confusability, wherein class pairs that are more confusable are assigned higher weight and class pairs that are less confusable are assigned lower weight.

21. The system of claim 17, wherein the computer-readable code is further configured to:

determine a mean for each class;

determine a matrix comprising terms determined by using the weights;

extract a real-time feature vector; and determine a reduced-dimension feature vector from the real-time feature vector by using the matrix.

22. The system of claim 17:

wherein the computer-readable code is further configured, when extracting a plurality of feature vectors from data, to:

extract a plurality of speech feature vectors from speech data; and combine a number of consecutive-in-time speech feature vectors into a large feature vector, thereby creating a plurality of large feature vectors; and wherein the computer-readable code is further configured, when determining a plurality of classes from the large feature vectors, to determine a plurality of classes from the large feature vectors.

23. The system of claim 22, wherein there are a plurality of class pairs and a plurality of weights, and wherein the computer-readable code is further configured to:

determine a between-class scatter matrix comprising entries determined from the weights and additional terms;

determine a within-class scatter matrix;

determine a transformation matrix from the within-class and between-class scatter matrices;

combine a number of consecutive-in-time real-time speech feature vectors into a large real-time speech feature vector; and determine a reduced-dimension feature vector from the large real-time speech feature vector by using the transformation matrix.

24. The system of claim 17, wherein the computer-readable code is further configured to:

determine a plurality of elements, each element determined from one of the weights multiplied by additional terms; and determine a between-class scatter matrix comprising the plurality of elements.

25. The system of claim 24:

wherein the computer-readable code is further configured to:

determine a mean for each of the classes;

determine a number of training vectors for each of the classes;

wherein the computer-readable code is further configured, when determining a plurality of elements, to:

select a class pair;

determine an element for the class pair by multiplying a corresponding weight for the class pair by the number of training vectors for a first of the classes of the class pair, by a number of training vectors for a second of the classes of the class pair, and by a square of the norm of the difference between a mean of the first class and a mean of the second class; and repeat selecting a class pair and determining an element for the class pair until all class pairs have been selected.

26. The system of claim 25:

wherein the square of the norm of the difference between a mean of the first class and a mean of the second class is determined by multiplying a first difference between the mean of the first class and the mean of the second class by a transpose of the first difference; and wherein the computer-readable code is further configured, when determining a plurality of elements, to divide an element by two times a total number of training samples.

27. An article of manufacture comprising:

a computer-readable medium having computer-readable program code means embodied thereon, the computer-readable program code means comprising:

a step to extract a plurality of feature vectors from data;

a step to determine a plurality of classes from the feature vectors; and a step to determine a weight associated with each class pair of the classes.

28. The article of manufacture of claim 27, wherein the computer-readable program code means further comprises, when determining the weight, a step to assign each weight by using a monotonically decreasing function of distance, wherein class pairs with less distance between classes are assigned higher weight and class pairs with greater distance between classes are assigned lower weight.

29. The article of manufacture of claim 28, wherein the computer-readable program code means further comprises a step to determine a mean for each of the classes, and a step to, when assigning each weight by using a monotonically decreasing function, assign each weight by determining an inverse of a Euclidean distance between a mean of one of the classes and a mean of another of the classes.

30. The article of manufacture of claim 27, wherein the computer-readable program code means further comprises, when determining the weight, a step to assign each weight by using a monotonically increasing finction of confusability, wherein class pairs that are more confusable are assigned higher weight and class pairs that are less confusable are assigned lower weight.

31. The article of manufacture of claim 27, wherein the computer-readable program code means further comprises:

a step to determine a mean for each class;

a step to determine a matrix comprising terms determined by using the weights;

a step to extract a real-time feature vector; and a step to determine a reduced-dimension feature vector from the real-time feature vector by using the matrix.

32. The article of manufacture of claim 27, wherein:

the computer-readable program code means further comprises, when extracting a plurality of feature vectors from data:

a step to extract a plurality of speech feature vectors from speech data; and a step to combine a number of consecutive-in-time speech feature vectors into a large feature vector, thereby creating a plurality of large feature vectors; and the computer-readable program code means further comprises, when determining a plurality of classes from the large feature vectors, a step to determine a plurality of classes from the large feature vectors.

33. The article of manufacture of claim 32, wherein there are a plurality of class pairs and a plurality of weights, and wherein the computer-readable program code means comprises:

a step to determine a between-class scatter matrix comprising entries determined from the weights and additional terms;

a step to determine a within-class scatter matrix;

a step to determine a transformation matrix from the within-class and between-class scatter matrices;

a step to combine a number of consecutive-in-time real-time speech feature vectors into a large real-time speech feature vector; and a step to determine a reduced-dimension feature vector from the large real-time speech feature vector by using the transformation matrix.

34. The article of manufacture of claim 27, wherein the computer-readable program code means further comprises:

a step to determine a plurality of elements, each element determined from one of the weights multiplied by additional terms; and a step to determine a between-class scatter matrix comprising the plurality of elements.

35. The article of manufacture of claim 34:

wherein the computer-readable program code means further comprises:

a step to determine a mean for each of the classes;

a step to determine a number of training vectors for each of the classes;

wherein the computer-readable program code means further comprises, when determining a plurality of elements:

a step to select a class pair;

a step to determine an element for the class pair by multiplying a corresponding weight for the class pair by the number of training vectors for a first of the classes of the class pair, by a number of training vectors for a second of the classes of the class pair, and by a square of the norm of the difference between a mean of the first class and a mean of the second class; and a step to repeat the steps of selecting a class pair and determining an element for the class pair until all class pairs have been selected.

36. The article of manufacture of claim 35:

wherein the square of the norm of the difference between a mean of the first class and a mean of the second class is determined by multiplying a first difference between the mean of the first class and the mean of the second class by a transpose of the first difference; and wherein the computer-readable program code means further comprises, when determining a plurality of elements, a step to divide an element by two times a total number of training samples.

* * * * *